(12) United States Patent
Savolainen

(10) Patent No.: US 6,892,063 B2
(45) Date of Patent: May 10, 2005

(54) COST CONTROL IN A TELECOMMUNICATIONS SYSTEM

(75) Inventor: Jarmo Juhani Savolainen, Ilmarinen (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 466 days.

(21) Appl. No.: 09/808,500

(22) Filed: Mar. 14, 2001

(65) Prior Publication Data

US 2001/0023181 A1 Sep. 20, 2001

(30) Foreign Application Priority Data

Mar. 14, 2000 (GB) .............................................. 0006023

(51) Int. Cl.⁷ .......................... H04Q 7/20; H04M 11/00
(52) U.S. Cl. ................. 455/405; 406/432.1; 406/432.3; 406/407; 406/408; 406/422.1
(58) Field of Search .............................. 455/422.1, 424, 455/425, 436, 432.1, 432.3, 433, 435.1, 432.2, 445, 405, 406, 411, 408, 407; 370/234, 331, 332; 379/114.01, 114.02, 114.03–114.04, 114.09, 114.17, 114.2, 144.01, 114.06

(56) References Cited

U.S. PATENT DOCUMENTS

| | | | | | |
|---|---|---|---|---|---|
| 5,303,297 | A | * | 4/1994 | Hillis ............................ | 455/406 |
| 5,517,555 | A | * | 5/1996 | Amadon et al. .............. | 455/408 |
| 5,684,861 | A | * | 11/1997 | Lewis et al. .................. | 455/405 |
| 5,757,784 | A | * | 5/1998 | Liebowitz et al. ...... | 379/115.02 |
| 5,828,737 | A | * | 10/1998 | Sawyer ................... | 379/114.07 |
| 5,898,915 | A | * | 4/1999 | Reininghaus et al. ........ | 455/406 |
| 6,061,436 | A | * | 5/2000 | Bauer et al. ............. | 379/114.01 |
| 6,061,556 | A | * | 5/2000 | Rahman ....................... | 455/406 |
| 6,125,173 | A | * | 9/2000 | Jagadish et al. ......... | 379/114.1 |
| 6,173,171 | B1 | * | 1/2001 | Plush et al. ................. | 455/408 |
| 6,198,915 | B1 | * | 3/2001 | McGregor et al. ........... | 455/406 |
| 6,205,211 | B1 | * | 3/2001 | Thomas et al. ......... | 379/114.06 |
| 6,236,851 | B1 | * | 5/2001 | Fougnies et al. ............ | 455/408 |
| 6,243,450 | B1 | * | 6/2001 | Jansen et al. ........... | 379/144.01 |
| 6,327,466 | B1 | * | 12/2001 | Savolainen ................... | 455/407 |
| 6,347,224 | B1 | * | 2/2002 | Smyth et al. ................. | 455/406 |
| 6,377,938 | B1 | * | 4/2002 | Block et al. ............. | 379/114.01 |
| 6,393,269 | B1 | * | 5/2002 | Hartmaier et al. ........... | 455/406 |
| 6,463,275 | B1 | * | 10/2002 | Deakin ......................... | 455/406 |
| 6,480,591 | B1 | * | 11/2002 | Penfield et al. ......... | 379/144.01 |
| 6,493,547 | B1 | * | 12/2002 | Raith ............................ | 455/405 |
| 6,532,281 | B1 | * | 3/2003 | Schoenborn ............ | 379/114.01 |
| 6,542,728 | B1 | * | 4/2003 | Kaku ............................ | 455/406 |
| 6,577,717 | B1 | * | 6/2003 | Henon ..................... | 379/114.01 |
| 6,671,285 | B1 | * | 12/2003 | Kirkby et al. ............... | 455/406 |

FOREIGN PATENT DOCUMENTS

| | | |
|---|---|---|
| DE | 27 57 369 | 7/1979 |
| GB | 2350017 | 11/2000 |
| WO | 97/26739 A1 | 7/1997 |
| WO | WO 98/07270 | 2/1998 |
| WO | WO 98/44716 | 10/1998 |
| WO | WO 99/46926 | 9/1999 |
| WO | WO 00/08841 | 2/2000 |
| WO | WO 00/11859 | 3/2000 |

OTHER PUBLICATIONS

Hou, Xinli, "Charging on Caller'Choice: Increasing Mobile Subscriber's Reachability by Camel" 1988, pp. 2605–2610, IEEE, New York, New York.

* cited by examiner

Primary Examiner—William Trost
Assistant Examiner—Meless Zewdu

(57) ABSTRACT

A method of monitoring the chargeable activities of a user in a mobile telecommunications network. The method comprises monitoring one or more conditions on which charging may be based and normalising the or each monitored condition so that the condition(s) can be compared against a standard value and/or used for calculating a charge.

16 Claims, 2 Drawing Sheets

COST CONTROL IN A TELECOMMUNICATIONS SYSTEM

BACKGROUND

The present invention relates to cost control in a telecommunications system and more particularly to cost control in a mobile telecommunications system.

In today's mobile telecommunications networks, the operator of a mobile network is able to maintain tight control over the calls made and services used by its subscribers when they are at home, i.e. when they are registered with the operator's own network. For example, if a subscriber exceeds his calling credit limit the operator can notify the subscriber of this situation and/or can prevent the subscriber from making further calls until his outstanding account is settled. Similarly, where a subscriber makes use of a top-up account, e.g. using scratch cards to credit his account, an operator can restrict the subscriber's access when the subscriber's credit drops to zero.

Such charging control is possible because the Mobile Switching Centre (MSC) which acts as the "local exchange" for a subscriber sends Call Detail Records (CDRs) at regular intervals to a charging node of the subscriber's home network. However, this is only possible when the serving MSC is an MSC of the home network. In the event that a mobile subscriber is registered with an MSC of a foreign network (i.e. the subscriber is "roaming"), CDRs generated by the MSC are passed to a home network through a clearing house in so-called TAP files (if necessary, multiple CDRs are collated in the foreign network and the collated CDRs are sent to the clearing house in a single TAP file). It can take at least two days or even more before the CDRs are forwarded on to the home network.

A home network cannot therefore monitor, in real time or near real time, the charges being incurred by one of its subscribers when that subscriber is roaming in a foreign network. Rather, charging information is only sent periodically from the foreign network to the home network (e.g. every few days). There therefore exists a possibility that fraud by a roaming subscriber will go undetected by the subscriber's home network for some time, and that during that time the home network operator will incur considerable losses. Furthermore, even though CDRs can be generated periodically for a subscriber when that subscriber is registered with his home network, the use of exchanges which generate CDRs at fixed regular intervals for all registered subscribers represents a non-optimal solution as the fixed interval may be too long for certain classes of subscribers and too short for others, and can unnecessarily increase the computational load in the serving exchange.

In order to overcome this problem, a protocol referred to as Customised Applications for Mobile network Enhanced Logic (CAMEL) has been standardised by ETSI (further enhancements to CAMEL are in the process of being standardised—3GPP). CAMEL provides for the transfer of charging related information in near real time between the home network (the "controlling" network) and a foreign network (the "serving" network) in which a subscriber of the home network is roaming. In particular, CAMEL enables a home network to authorise a roaming subscriber for a fixed time period at the end of which the foreign network must seek a new authorisation for the subscriber. It will be appreciated that the main application of CAMEL is in respect of pre-paid subscribers.

In the future, billing for mobile services is likely to be made on the basis of criteria other than simply time and call destination (or origin). For example, with the introduction of packet switched data services such the GSM phase 2 enhancement known as General Packet Radio Service (GPRS), it may be appropriate to charge subscribers on the basis of data volume sent (or received) and the destination (or source) of the data.

According to the current CAMEL proposal to control GPRS, the serving node (i.e. the Serving GPRS Support Node (SGSN)) for a given subscriber will simultaneously monitor a data connection established by a subscriber vis-a-vis call time and sent data volume. The serving node uses time and data volume limits (previously received from the subscriber's home network) to trigger the sending of respective new authorisation requests to the home network. Time and data volume are treated independently of one another resulting in a large volume of charging related signalling information being sent back and forth between the foreign network and the home network. The more charging criteria are used, the greater will be the volume of charging related signalling information. Signalling traffic represents a significant cost factor for network operators, and the current CAMEL proposal is therefore not optimal.

SUMMARY

It is an object of the present invention to overcome or at least mitigate the disadvantages of existing charge monitoring proposals. In particular, it is an object of the present invention to provide a mechanism for monitoring the chargeable activities of a subscriber in such a way as to reduce charging related signalling traffic. These and other objects are achieved at least in part by normalising different monitored charge related conditions at a serving node so that they can be compared against a common charging standard.

According to a first aspect of the present invention there is provided a method of monitoring the chargeable activities of a user in a mobile telecommunications network, the method comprising:

monitoring one or more conditions on which charging may be based; and normalising the or each monitored condition so that the condition(s) can be compared against a standard value and/or used for calculating a charge.

The present invention provides a mechanism whereby different monitored conditions can be directly compared and, if necessary, combined for the purpose of generating a value or values which can be used to trigger charging related events and/or to directly calculate charges.

Examples of different conditions to which the present invention may be applied are the duration of a connection and the volume of data sent by the user. Different conditions may be defined for different call and data transfer destinations.

Preferably, said steps of monitoring one or more conditions and of normalising the or each monitored condition are carried out at the serving node for the user. In a GSM network the node may be a Mobile Switching Centre (MSC). In a GSM phase 2 network, the node may be a Serving GPRS Support Node (SGSN). In a UMTS network, the node may be an evolution of an MSC or SGSN node.

Preferably, the normalising factors are transferred from a charge control function of said network, or of another network to which the user is a subscriber, either upon initiation of a chargeable activity or prior to such initiation, e.g. during registration of the user with the serving node. A standard value which defines a cost limit up to which the user is authorised, and against which a monitored condition or combination of monitored conditions is compared, may also be transferred from said charge control function to said serving node.

Preferably, the normalising factors are transferred from a Service Control Function/Cost Control Function (SCF/CCF) implemented at a charge control node to a Service Switching Function implemented at the serving node.

Preferably, the method of the present invention is employed when the user is a subscriber of a home network and is roaming in a foreign network. In the case of GSM networks (including enhanced GSM networks), the normalising factors may be transferred from the home network to the serving node of the foreign network using the CAMEL protocol, and more particularly using the CAMEL Application Part (CAP).

In one embodiment of the invention, a normalised monitored condition, or a combination of normalised monitored conditions, is compared against a standard value which defines a cost limit up to which the user is authorised. If the condition or combination of conditions reaches the standard value, the serving node may send an authorisation request to a charge controlling node, e.g. in the user's home network.

According to second aspect of the present invention there is provided a node of a mobile telecommunications network which provides in use a serving node for one or more mobile users, the apparatus comprising:

means for monitoring one or more conditions on which charging may be based; and means for normalising the or each monitored condition so that the condition(s) can be compared against a standard value and/or used for calculating a charge.

DETAILED DESCRIPTION

Figure 1:
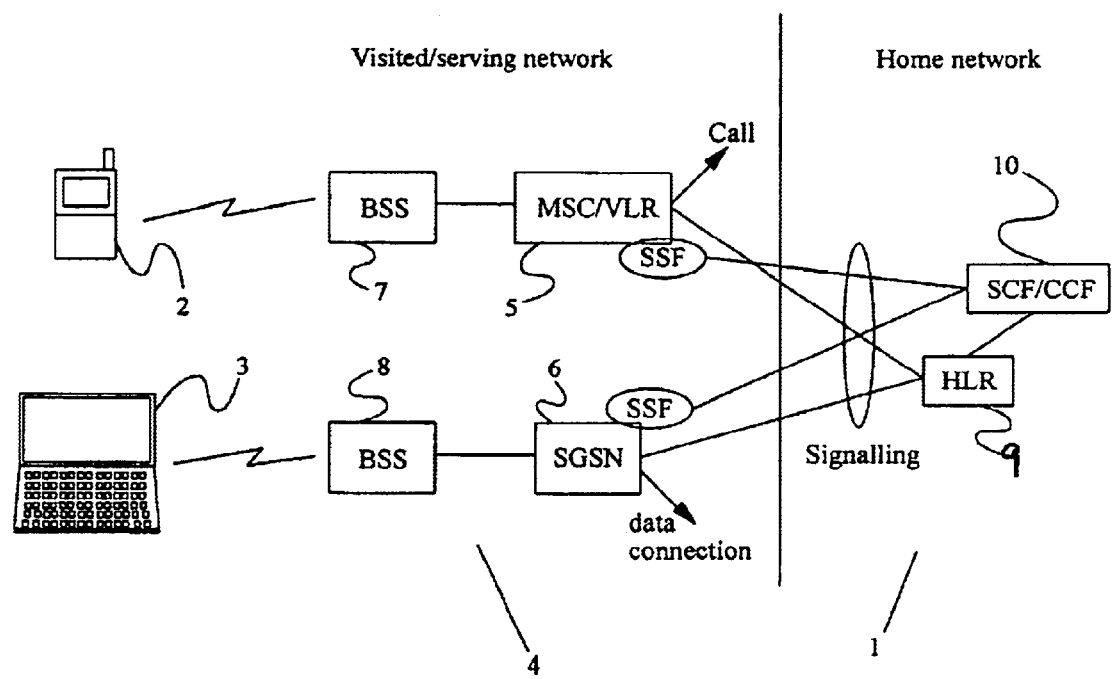
FIG. 1 illustrates schematically a mobile telecommunications system in which a subscriber of a home network is roaming in a foreign network.

There is illustrated in FIG. 1 a telecommunications system comprising two interconnected Public Land Mobile Networks (PLMNs). For the purposes of the following illustration, a first of the PLMNs 1 represents the home network of a subscriber using a mobile telephone 2 or wireless data terminal 3, and is referred to as the Home PLMN (HPLMN). The second of the PLMNs 4 is referred to as the Visited PLMN (VPLMN). Only those nodes of the networks 1,4 relevant to the following discussion are illustrated in FIG. 1. Both of the networks 1,4 are Global System for Mobile communications (GSM) based networks and support GPRS. Illustrated in the VPLMN 4 are a Mobile Switching Centre (MSC) 5 (which is co-located with a Visitor Location Register (VLR)) and a Serving GPRS Support Node (SGSN) 6 which are responsible for connecting and routing voice and data calls respectively. Both the MSC/VLR 5 and the SGSN 6 are coupled in use to the subscriber equipment 2,3 via Base Station Sub-systems (BSS) 7,8. The networks 1,4 are coupled together via Gateway nodes although these are not illustrated in FIG. 1.

Illustrated in the HPLMN 1 is a Home Location Register (HLR) 9. The HLR 9 maintains a record of all of the subscribers of the HPLMN 1, including the International Mobile Subscriber Identity (IMSI) for each subscriber and which is used by a subscriber to register with a network. A Service Control Function (SCF)/Cost Control Function (CCF) is implemented at a Service Control Point 10 which, together with a HLR 9, forms part of a Home Subscriber System. For each subscriber, the SCF/CCF 10 records details of the tariff to which the subscriber subscribes. For example, a subscriber may subscribe to a "business tariff" which defines the cost of voice calls in terms of caller location, called party destination, duration, and time of day. The cost of data calls may also be defined using these same conditions, and additionally the volume of data sent to and/or received by the subscriber during a data call and the Quality of Service (QoS) involved.

For each separate charge band, a normalising value is defined. For example, assume that the charging rate for transferring 10 Kbytes of data over a long distance connection is 1 charging unit. Then a normalising value of 10 (Kbytes/charging units) is defined for this band. If the charging rate for transferring 10 Kbytes of data over a local connection is 0.1 charging unit, then the normalising value for this band is 100 (Kbytes/charging units). Similarly, if the charging rate for a long distance call is 0.25 charging units per minute, then a normalising value of 4 (minutes/charging unit) is assigned to this charging band.

Associated with each MSC 5 is a Visitor Location Register (VLR) which maintains a record of subscribers currently registered with the associated MSC 5. The record includes subscribers for whom the MSC 5 is a home MSC, as well as subscribers for whom the MSC 5 is a foreign network. In the event that the subscriber using the mobile telephone 2 roams outside of the coverage area of his HPLMN 1 and into the coverage area of the VPLMN 4, his telephone 2 will seek to register with an MSC 5 of the VPLMN 4 after the MSC 5 has determined that the subscriber is a subscriber of a foreign network and has not already been registered in the associated VLR.

The registration process is initiated by the telephone 2 sending to the serving MSC 5 the subscriber's IMSI (usually stored in a SIM card). In order to authenticate the subscriber, the MSC 5 uses the Mobile Application Part (MAP) protocol to send a MAP UPDATE_LOCATION message to the HLR 9 of the subscriber's HPLMN 1 (the HPLMN 1 is identified by a prefix part of the IMSI). Assuming that the HLR 9 verifies the IMSI contained in the message, the HLR 9 returns a MAP INSERT_SUBSCRIBER_DATA message to the serving MSC. Registration of the wireless data terminal 3 with the SGSN 6 involves a similar exchange of messages with the HLR 9 of the HPLMN 1. Assuming that the serving node (MSC 5 or SGSN 6) does indeed receive a MAP UPDATE_SUBSCRIBER_DATA message from the HLR 9 of the HPLMN 1, the subscriber is registered with the serving node. (The SGSN 6 also makes use of the VLR which is co-located with the MSC 5, although it is noted that the GPRS network may sometimes posses a separate VLR which may or may not be co-located with the SGSN.)

In the event that a subscriber initiates a connection, e.g. a data call to a subscriber of the same or a different network, a Service Switching Function (SSF) implemented by the SGSN 6 contacts the SCF/CCF 10 of the HPLMN 1 using the CAMEL protocol (which in turn makes use of the CAMEL Application Part (CAP)). A CAP message is sent which contains details of the connection which the subscriber 3 has initiated (e.g. destination(s), QoS(s), etc). On the basis of the received connection information, the SCF/CCF 10 selects the appropriate charge band(s) and hence the appropriate normalising value(s). The selected normalising value(s) is(are) returned to the enquiring SCF/CCF 10 using a CAP message. The SCF/CCF 10 may also include in this message a charging unit authorisation limit for the initiated connection.

Assuming that the SSF receives an authorising CAP message from the SCF/CCF 10, the requested connection is established, and the SSF monitors the various charging conditions associated with the call, including time and transmitted data traffic. For example, the SSF may monitor the duration of the call C1 and the volume of data sent (each of the two conditions having a corresponding normalising value N1, N2)). As they are monitored, the conditions are divided by the respective normalising values to establish the consumed charging units. The determined consumed charging units are then added together to determine the total consumed charging units (i.e. total=C1/N1+C2/N2). This total is then compared against the charging unit authorisation limit. When the limit is reached, the SSF may instruct the serving node to suspend the connection, and to seek a further authorisation from the subscriber's home network (by way of a further CAP message).

Figure 2:
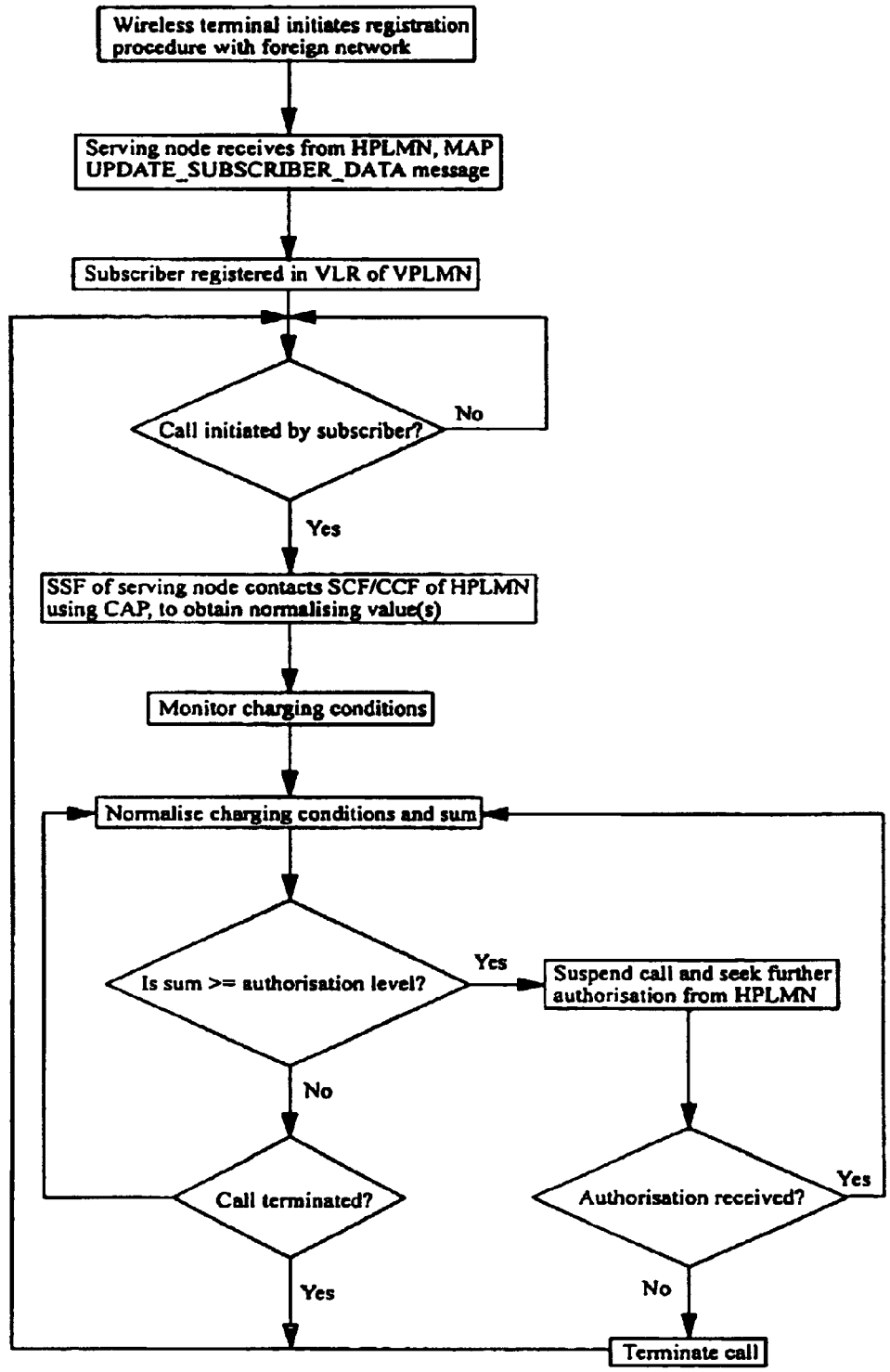
FIG. 2 is a flow diagram illustrating the operation of a charge monitoring mechanism in the system of FIG. 1.

The charge monitoring mechanism described above is further illustrated in the flow diagram of FIG. 2.

In addition to comparing the consumed charging unit total against the charging unit authorisation limit, the SSF may use the total to generate Call Detail Records (CDRs). The CDRs are sent by the serving node to the HPLMN 1 where they may be received by the Service Control Point 10 or by some other node such as the HLR 9. The CDRs may be used by the HPLMN 1 for the purpose of near real time billing or fraud control.

It will be appreciated that various modifications may be made to the above described embodiment without departing from the scope of the present invention. For example, rather than normalising the monitored conditions to generate consumed charging units, the conditions may be normalised against one selected condition. More particularly, if the selected condition is the transmitted data volume (to a given destination at a give QoS), normalising values are chosen to convert the others of the monitored conditions into the equivalent values of that selected condition (e.g the normalising value for a time related condition would have units of minutes/Mbyte).

In another modification, a revised normalising value (or values) may be sent from the SCF/CCF 10 to the SSF of the serving node during a previously established connection (e.g. following the sending of a CAP message to the SCF/CCF 10 containing revised connection related parameters). The revised normalising values(s) are then used for the remainder of the connection (unless further revised normalising values are subsequently delivered).

In yet another modification, normalising values may be sent from the SCF/CCF 10 to the SSF of the serving node during registration of the subscriber, using the MAP UPDATE_SUBSCRIBER_DATA message. It is then up to the SSF to select the appropriate value(s) when the subscriber initiates a connection. This solution is not however optimal, as it requires all possible normalising values to be transmitted to the SSF, adding to the volume of signalling traffic.

What is claimed is:

1. A method of monitoring the chargeable activities of a user in a mobile telecommunications network, the method comprising the steps of:

monitoring at least a first condition (C1) and a second condition (C2) on which charging is based;

normalizing said first condition against a first normalizing value (N1) and said second condition against a second normalizing value (N2), said step of normalizing comprising dividing the value of said condition by said normalizing value to yield normalized conditions;

adding said first (C1/N1) and second (C2/N2) normalized conditions to yield a total consumed charging units value;

comparing said total consumed charging units value against a charging unit authorization limit; and wherein said user is a subscriber of a home network and is roaming in a foreign network, and where in the first and second normalizing values are transferred from the home network to the serving node of the foreign network using the Customized Applications for Mobile Network Enhanced Logic (CAMEL) protocol.

2. The method according to claim 1, wherein said conditions include time based and data transfer volume based conditions.

3. The method according to claim 1, wherein said steps of monitoring and normalizing are carried out at the serving node for the user.

4. The method according to claim 3, wherein said mobile telecommunications network is a Global System for Mobile Communications (GSM) network and said serving node is a Mobile Switching Center (MSC).

5. The method according to claim 3, wherein said mobile telecommunications network is a Global System for Mobile Communications (GSM) network or a Serving General Packet Radio Service (GPRS) Support Node (SGSN).

6. The method according to claim 1, wherein the normalizing values are transferred from a charge control function of said network, or of another network to which the user is a subscriber, either upon initiation of a chargeable activity or prior to such initiation.

7. The method according to claim 6, wherein said charging unit authorization limit, which defines a cost limit up to which the user is authorized, and against which a monitored condition or combination of monitored conditions is compared, is transferred from said charge control function to said serving node.

8. The method according to claim 1, wherein at least one normalized monitored condition, or a combination of normalized monitored conditions, is compared against a predetermined value which defines a cost limit up to which the user is authorized, and, if the condition or combination of conditions reaches the predetermined value, the serving node sends an authorization request to a charge controlling node.

9. A node of a mobile telecommunications network which serves one or more mobile users, the node comprising:

means for monitoring at least a first condition (C1) and a second condition (C2) on which charging is based;

means for normalizing said first condition against a first normalizing value (N1) and said second condition against a second normalizing value (N2), said means for normalizing comprising means for dividing the value of said condition by said normalizing value to yield normalized conditions;

means for adding said first (C1/N1) and second (C2/N2) normalized conditions to yield a total consumed charging units value;

means for comparing said total consumed charging units value against a charging unit authorization limit; and wherein said user is a subscriber of a home network and is roaming in a foreign network, and the normalizing values are transferred from the home network to the serving node of the foreion network using the Customized Application for Mobile Network Enhanced Logic (CAMEL) protocol.

10. The node of claim 9, wherein said conditions include time based and data transfer volume based conditions.

11. The node of claim 9, wherein the serving node monitors and normalizes said conditions.

12. The node of claim 11, wherein said mobile telecommunications network is a Global System for Mobile Communications (GSM) network and said serving node is a Mobile Switching Center (MSC).

13. The node of claim 11, wherein said mobile telecommunications network is a Global System for Mobile Communications (GSM) network or a Serving General Packet Radio Service (GPRS) Support Node (SGSN).

14. The node of claim 9, wherein the normalizing values are transferred from a charge control function of said network, or of another network to which the user is a subscriber, either upon initiation of a chargeable activity or prior to such initiation.

15. The node of claim 14, wherein said charging unit authorization limit, which defines a cost limit up to which the user is authorized, and against which a monitored condition or combination of monitored conditions is compared, is transferred from said charge control function to said serving node.

16. The node of claim 9, wherein at least one normalized monitored condition, or a combination of normalized monitored conditions, is compared against a standard value which defines a cost limit up to which the user is authorized, and, if the condition or combination of conditions reaches the standard value, the serving node sends an authorization request to a charge controlling node.

* * * * *